US012238473B2

(12) United States Patent
Jin et al.

(10) Patent No.: US 12,238,473 B2
(45) Date of Patent: Feb. 25, 2025

(54) APPARATUS AND METHOD FOR PERFORMING ACTIVE OCCLUSION CANCELLATION WITH AUDIO HEAR-THROUGH

(71) Applicant: STARKEY LABORATORIES, INC., Eden Prairie, MN (US)

(72) Inventors: Wenyu Jin, Eden Prairie, MN (US); Masahiro Sunohara, Minneapolis, MN (US); Jingjing Xu, Eden Prairie, MN (US)

(73) Assignee: STARKEY LABORATORIES, INC., Eden Prairie, MN (US)

( * ) Notice: Subject to any disclaimer, the term of this patent is extended or adjusted under 35 U.S.C. 154(b) by 178 days.

(21) Appl. No.: 17/968,123

(22) Filed: Oct. 18, 2022

(65) Prior Publication Data

US 2023/0136161 A1 May 4, 2023

Related U.S. Application Data

(60) Provisional application No. 63/273,436, filed on Oct. 29, 2021.

(51) Int. Cl.
*H04R 1/10* (2006.01)
*G10K 11/178* (2006.01)

(52) U.S. Cl.
CPC ..... *H04R 1/1083* (2013.01); *G10K 11/17854* (2018.01); *H04R 1/1016* (2013.01); *H04R 2460/05* (2013.01)

(58) Field of Classification Search
CPC ........................... H04R 1/1083; H04R 1/1016; H04R 2460/05; G10K 11/17854
See application file for complete search history.

(56) References Cited

U.S. PATENT DOCUMENTS

| | | | | |
|---|---|---|---|---|
| 8,218,802 | B2 | 7/2012 | Arndt et al. | |
| 9,020,160 | B2 | 4/2015 | Gauger, Jr. | |
| 10,657,950 | B2 | 5/2020 | Hua et al. | |
| 10,951,990 | B2 | 3/2021 | Nawfal et al. | |
| 2009/0041260 | A1 * | 2/2009 | Jorgensen | H04R 25/505 381/71.6 |
| 2014/0126735 | A1 * | 5/2014 | Gauger, Jr. | G10K 11/17837 381/71.6 |
| 2018/0225082 | A1 * | 8/2018 | An | H04R 1/406 |
| 2021/0306772 | A1 * | 9/2021 | Wiss | H04R 25/652 |
| 2021/0409860 | A1 * | 12/2021 | Bean | G10K 11/17875 |
| 2022/0038832 | A1 * | 2/2022 | Khaleghimeybodi | H04R 25/50 |

OTHER PUBLICATIONS

Liebich et al, "Active Occlusion Cancellation with Hear-Through Equalization for Headphones", IEEE International Conference on Acoustics, Speech and Signal Processing, Calgary, Canada, Apr. 2018, 5 pages.

* cited by examiner

*Primary Examiner* — Daniel R Sellers
(74) *Attorney, Agent, or Firm* — Mueting Raasch Group

(57) ABSTRACT

Adaptive occlusion cancellation is performed in an ear-wearable device using an adaptive filter. An adaptive gain of the adaptive filter is used to determine a leakage path estimate between an external source and an eardrum of the user through the ear-wearable device. The leakage path estimate is used to update an adaptive hear-through filter of the ear-wearable device. The updated adaptive hear-through filter is used for hear-through processing in the ear-wearable device.

20 Claims, 7 Drawing Sheets

$$\underline{\underline{F}} = \underline{\underline{\mathfrak{F}}}^{(N_F \times N_F)} \begin{bmatrix} \underline{\underline{I}}^{(N_T \times N_T)} \\ \underline{\underline{O}}^{(N_F - N_T \times N_T)} \end{bmatrix}$$

APPARATUS AND METHOD FOR PERFORMING ACTIVE OCCLUSION CANCELLATION WITH AUDIO HEAR-THROUGH

RELATED PATENT DOCUMENTS

This application claims the benefit of U.S. Provisional Application No. 63/273,436, filed on Oct. 29, 2021, which is incorporated herein by reference in its entirety.

SUMMARY

This application relates generally to ear-level electronic systems and devices, including hearing aids, personal amplification devices, and hearables. In one embodiment, an apparatus and method facilitate active occlusion cancellation with audio hear-through. One embodiment involves performing occlusion cancellation in an ear-wearable device using an adaptive occlusion cancellation filter. An adaptive gain of the adaptive occlusion cancellation filter is used to determine a leakage path estimate between an external source and an eardrum of a user through the ear-wearable device. The leakage path estimate is used to update an adaptive hear-through filter of the ear-wearable device. The updated adaptive hear-through filter is used for hear-through processing in the ear-wearable device.

Another embodiment involves performing occlusion cancellation in an ear-wearable device using a first adaptive filter. Hear-though processing is performed in the ear-wearable device using a second adaptive filter. A leakage path is estimated between an external source and an eardrum of a user through the ear-wearable device based on an adaptive gain of the first adaptive filter. Adaptive filter parameters of the second adaptive filter are updated based on the estimate of the leakage path.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below makes reference to the following figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Embodiments disclosed herein are directed to an ear-worn or ear-level electronic hearing device. Such a device may include cochlear implants and bone conduction devices, without departing from the scope of this disclosure. The devices depicted in the figures are intended to demonstrate the subject matter, but not in a limited, exhaustive, or exclusive sense. Ear-worn electronic devices (also referred to herein as "hearing aids," "hearing devices," and "ear-wearable devices"), such as hearables (e.g., wearable earphones, ear monitors, and earbuds), hearing aids, hearing instruments, and hearing assistance devices, typically include an enclosure, such as a housing or shell, within which internal components are disposed.

In embodiments described below, a hearing device includes active occlusion cancellation (AOC). The occlusion effect describes the boost of own voice and boost/reduction of other sounds due to a partially- or fully occluded ear canal. The occlusion effect can be reduced in an ear-wearable device including vents up to diameters of 1.8 mm and some more than 1.8 mm. However, full occlusion is desirable for proper active noise cancellation (ANC) processing. Therefore, an ear-wearable device that is designed to occlude the ear canal can include AOC circuitry to reduce the effects of the occlusion.

The goal of AOC technology is to make the own voice for an occluded ear canal sound the same as that for nonoccluded listening when the user is talking. Embodiments described herein combine the active occlusion cancellation system with hear-through. Generally, hear-through processing involves receiving sound via an external microphone and reproducing the sound in the ear canal with a receiver/loudspeaker. Hear-through processing may also condition the sound to account for hearing loss, e.g., boosting overall volume, boosting high frequencies. In order to achieve the overall goal of making the perception of ambient sound and own-voice for an occluded ear canal sound equivalent as that for unaided listening, there are advantages in having both occlusion cancellation and hear-through processing jointly optimized, which features adaptations for both occlusion cancellation processing and hear-through filter design.

Figure 1:
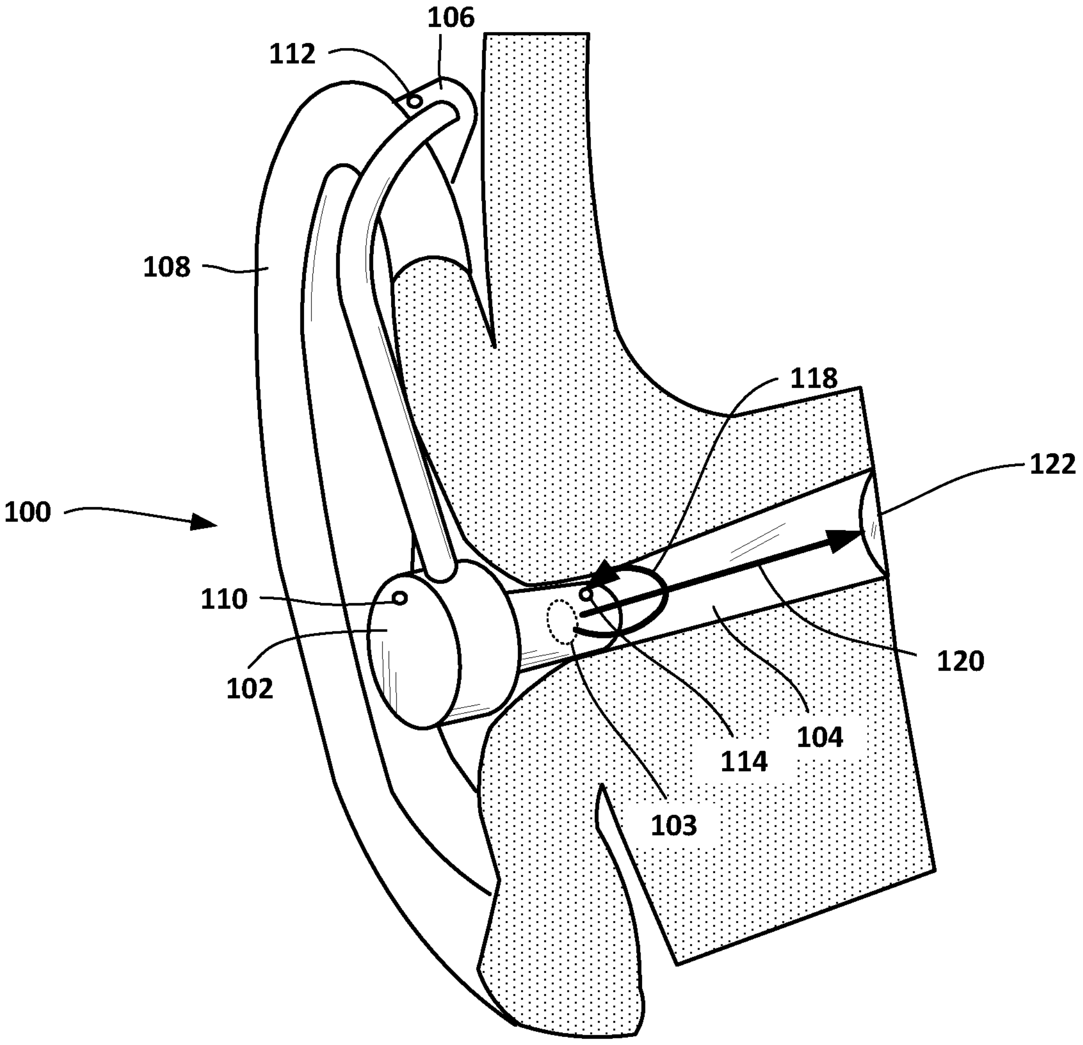
FIG. 1 is an illustration of a hearing device according to an example embodiment.

In FIG. 1, a diagram illustrates an example of an ear-wearable device 100 according to an example embodiment. The ear-wearable device 100 includes an in-ear portion 102 that fits into the ear canal 104 of a user/wearer. The ear-wearable device 100 may also include an external portion 106, e.g., worn over the back of the outer ear 108. The external portion 106 is electrically and/or acoustically coupled to the internal portion 102. The in-ear portion 102 may include an acoustic transducer 103, although in some embodiments the acoustic transducer may be in the external portion 106, where it is acoustically coupled to the ear canal 104, e.g., via a tube. The acoustic transducer 103 may be referred to herein as a "receiver," "loudspeaker," etc., however could include a bone conduction transducer. One or both portions 102, 106 may include an external microphone, as indicated by respective microphones 110, 112.

The device 100 may also include an internal microphone 114 that detects sound inside the ear canal 104. The internal microphone 114 may also be referred to as an inward-facing microphone or error microphone. For purposes of the following discussion, path 118 represents a secondary path, which is the physical propagation path from receiver 103 to the error microphone 114 within the ear canal 104. Path 120 represents an acoustic coupling path between the receiver 103 and the eardrum 122 of the user. In embodiments below, other audio coupling paths will be described that are more specific to AOC and hear-through processing.

Other components of hearing device 100 not shown in the figure may include a processor (e.g., a digital signal processor or DSP), memory circuitry, power management and charging circuitry, one or more communication devices (e.g., one or more radios, a near-field magnetic induction (NFMI) device), one or more antennas, buttons and/or switches, for example. The hearing device 100 can incorporate a long-range communication device, such as a Bluetooth® transceiver or other type of radio frequency (RF) transceiver.

While FIG. 1 show one example of a hearing device, often referred to as a hearing aid (HA), the term hearing device of the present disclosure may refer to a wide variety of ear-level electronic devices that can aid a person with impaired hearing. This includes devices that can produce processed sound for persons with normal hearing. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to a "hearing device" or "ear-wearable device," which is understood to refer to a system comprising a single left ear device, a single right ear device, or a combination of a left ear device and a right ear device.

Figure 2:
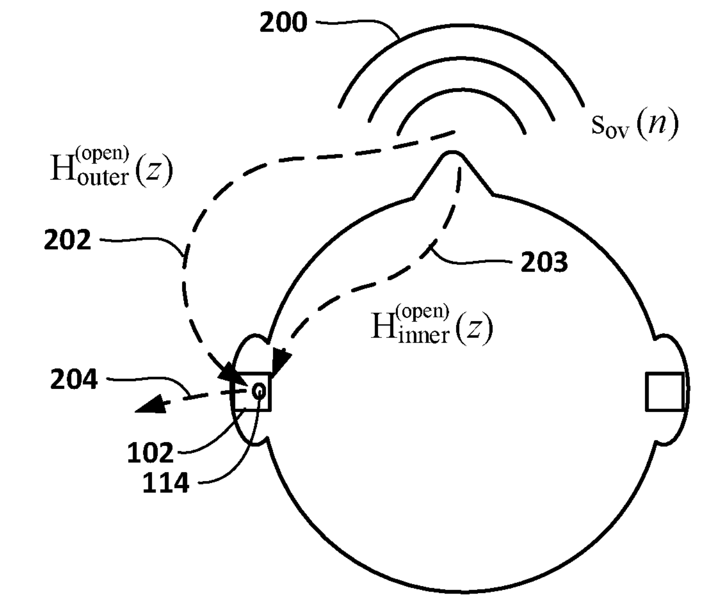
FIGS. 2 and 3 are diagrams showing own-voice, acoustic paths for open and occluded cases according to an example embodiment.
Figure 3:
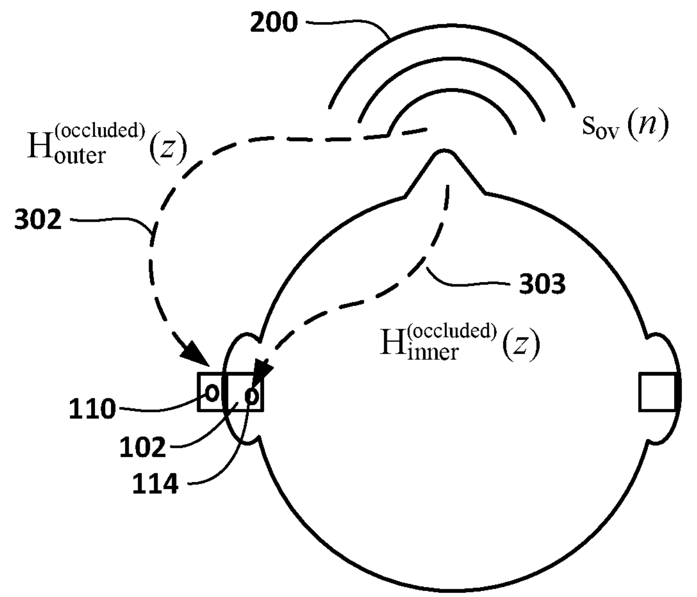

In FIGS. 2 and 3, diagrams illustrate the different acoustic path models in an open, non-occluded state (FIG. 2) and an occluded state (FIG. 3). As seen in the open state in FIG. 2, the user's own voice 200 travels through an outer path 202 to the inner microphone 114, e.g., conducted through the air. The inner path 203 conducts sound through the user's body to the inner microphone 114. Arrow 204 represents sound leaving the user's ear. As seen in the occluded state in FIG. 3, the user's own voice 200 travels through an outer path 302 to the outer microphone 110, e.g., conducted through the air. The inner path 303 conducts sound through the user's body to the inner microphone 114. Due to the occlusion, there is negligible sound leaving the ear in FIG. 3.

The occlusion effect describes the boost of own voice and other sounds due to a partially- or fully-occluded ear canal. Therefore, path 303 will be boosted relative to path 203, and path 302 will be attenuated relative to path 202. Further, the boost attenuation is not uniform over all frequencies. For own voice, the boost is generally in frequency range 125 Hz-1.5 kHz. Illustration of the occlusion effect can be found in May, A. E., and Dillon, H. (1992); "A comparison of physical measurements of the hearing aid occlusion effect with subjective reports," The Australian Journal of Audiology, Supplement 5, May 12. Occlusion effect sound pressure levels may vary in amplitude between patients from as little as 5-9 dB to 25-32 dB, with peaks at different frequencies.

The task in active occlusion cancellation is to make the perception of own-voice and external sound source(s) for an occluded ear canal sound the same as that for non-occluded listening. The embodiments described herein consider the active occlusion cancellation system with hear-through. In order to achieve the overall goal of making the perception of ambient sound-plus-own-voice for an occluded ear canal sound equivalent as that for unaided listening, both occlusion cancellation and hear-through processing are jointly optimized/designed. Conventionally, the (individualized) hear-through filter and active occlusion cancellation are implemented separately. In doing this, an issue of inaccurate reproduction of audio transparency may arise as AOC systems actively cancels the residual ambient sound that leaks into ear-canal.

Figure 4:
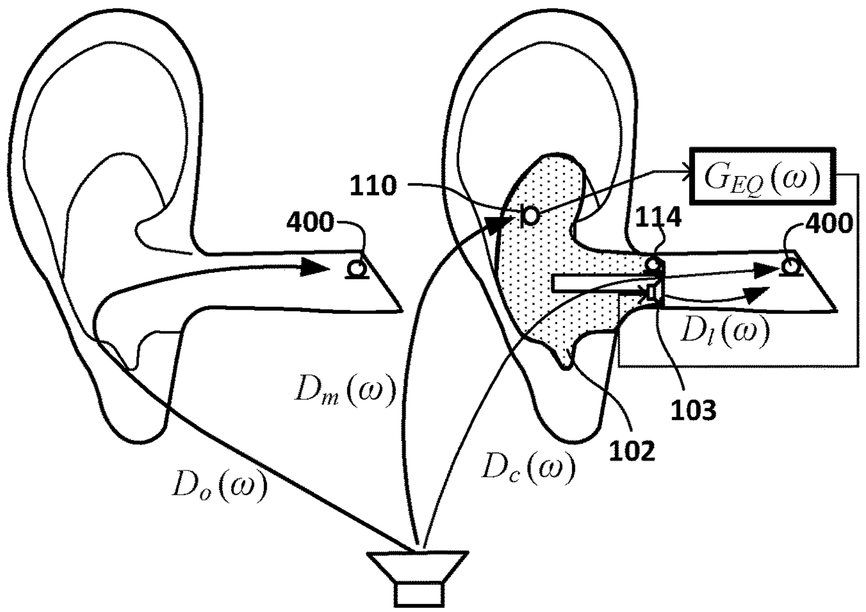
FIG. 4 shows differences in hear-through acoustic paths with and without an ear-wearable device.

In FIG. 4, a diagram shows details of an individualized hear-through filter design according to an example embodiment. On the left side of FIG. 4, an unaided (open) audio path is shown, and on the right side, an aided path is shown with in-ear portion 102 in use. Note that the eardrum 400 is modeled as a microphone in this example, and the in-ear portion of the ear-wearable device 102 would include an error microphone 114 that would estimate the eardrum response. The equalization filter $G_{EQ}(W)$ can be computed based on a frequency-domain least-squares optimization problem. Acoustic hear-through means that the transfer function from external source(s) to the eardrum is equivalent in the open and the aided case such that $D_o(\omega)=D_{aided}(\omega)$, such that $D_o(w)=D_m(\omega)\, D_I(\omega)\, G_{EQ}(\omega)+D_c(\omega)$.

Therefore, a least-squares optimization is found using the matrix form $\|(D_m'\hat{D}_I G_{EQ}+D_r')-D_o'\|_2^2+\mu\|G_{EQ}\|^2$, where $D_m$ 'are diagonal matrices containing the discrete Fourier transform (DFT) coefficients of Dm(ω), $\hat{D}_I$ are diagonal matrices containing the DFT coefficients of MO)), and $D_c$' and $D_o$' are corresponding vectors containing the DFT coefficients of the occluded and open responses. However, it should be noted that feedback AOC actively suppress both residual own voice and the direct path $D_c(\omega)$ that leaks into ear canal (especially at lower frequencies). Therefore, there is a mismatch between the feedback-loop suppressed direct path function and the ground-truth $D_c'(\omega)$.

Figure 6:
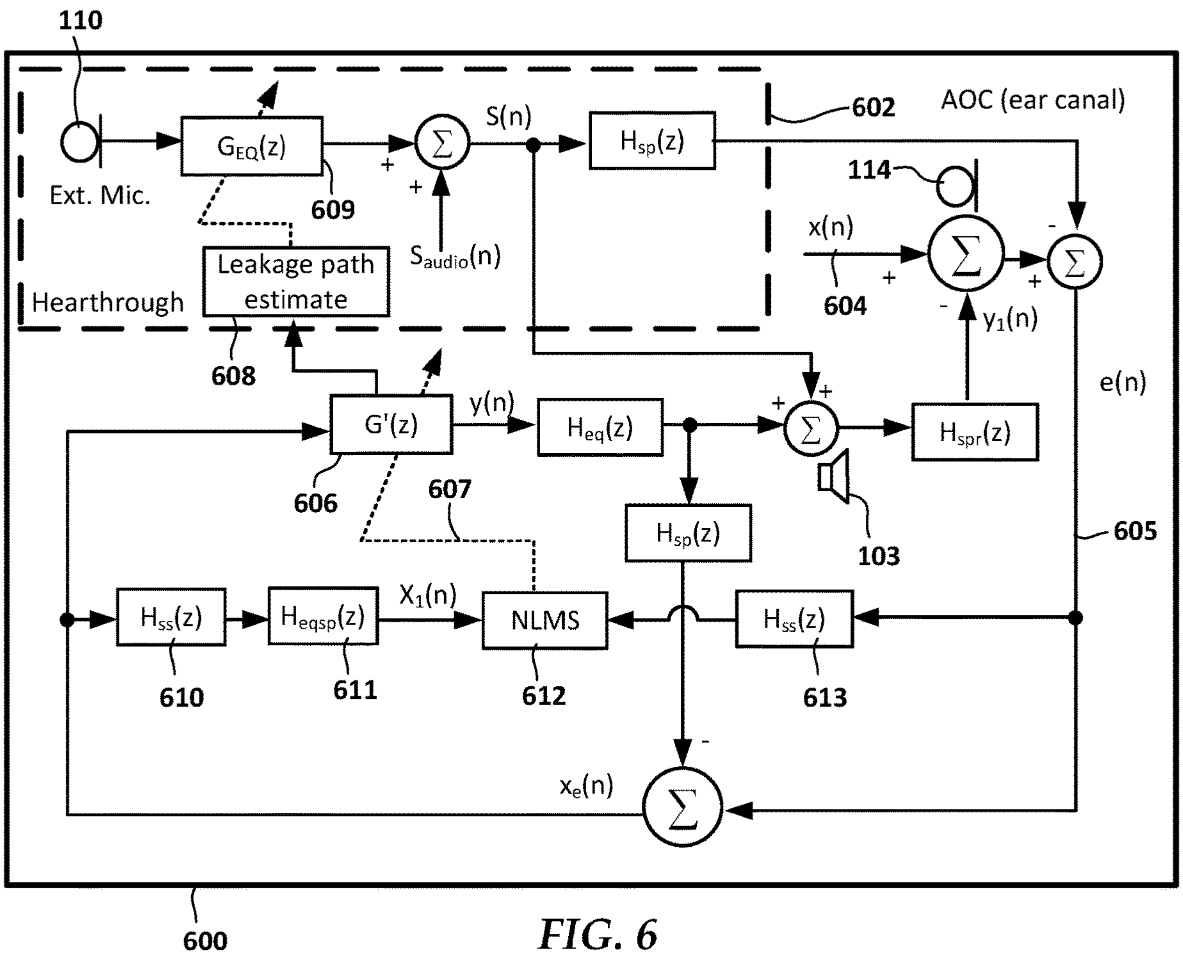
FIG. 6 is a block diagram showing processing paths for hear-through and active occlusion cancellation in an ear wearable device according to an example embodiment.

Assume the active residual path from external source to eardrum is $D_{c,active}(\omega)$, thus $D_o(\omega)=D_m(\omega)\, D_o(\omega)\, G_{EQ}'(\omega)+D_{c,active}'(\omega)$. Therefore, updating the hearthrough filter $G_{EQ}(\omega)$ will involve actively estimating the residual path from external source to ear canal $D_{c,active}'(\omega)$. In FIG. 6, a block diagram illustrates a proposed system for an ear-wearable device that features both adaptive occlusion cancellation processing and adaptation to hear-through filters. The diagram is divided into two sections, with section 600 illustrating the AOC processing components and section 602 illustrating the hear-through processing components.

An adaptive filter 606 performs adaptive occlusion cancellation in the ear-wearable device. An adaptive gain 607 of the adaptive filter 606 is used to determine a leakage path estimate 608 between the ear-wearable device and an ear of the user. Note that the term "gain" used in this context refers to parameters, coefficients, taps, etc., that affect a response of the adaptive filter. The leakage path estimate 608 is used to update an adaptive hear-through filter 609 of the ear-wearable device. The adaptive hear-through filter 609 is used for hear-through processing in the ear-wearable device. The output of the adaptive hear-through filter 609 is combined with the AOC processing output before the receiver 103. If streaming is utilized, the streaming audio signal $s_{audio}(n)$ is combined with the output of the adaptive hear-through filter 609 before being reproduced by the receiver 103.

Note that the updates to the adaptive filters 606, 609 may occur synchronously or asynchronously. For example, updates to one filter may occur more frequently than updates to another due to complexity of the filter algorithms, sensitivity of the processing to update frequency, relative resource utilization (e.g., processor or memory), etc. As noted elsewhere, the updates to adaptive hear-through filter 609 via the leakage path estimate 608 may be paused in some situations (e.g., streaming audio, presence of own-voice), although the hear-through processing may experience adjustments elsewhere in the processing path during those times.

Using the leakage path estimate 608 to update the hear-through filter 609 can optimize the hear-through processing. In addition to the adaptive filter 606, the occlusion cancellation include spectrum shaping filter 610 and equalization filter 611 that provide inputs to a normalized least mean squares (NLMS) algorithm processor 612. Another spectrum shaping filter 613 is also input to the NLMS processor 612, and an output of the NLMS processor 612 causes the changes to the adaptive filter 606.

Figure 7:
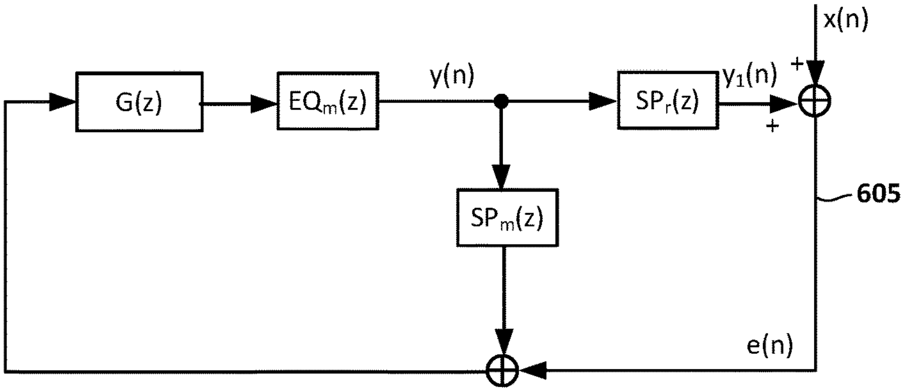
FIG. 7 is a block diagram showing closed loop transfer function for a hearing device according to an example embodiment.

Because adaptive feedback system is input signal-dependent, the transfer function from input signal x(n) (604) to output error signal e(n) (605) is time-variant. For a static feedback system (as shown below), the close-loop transfer function can be derived as shown in the block diagram of FIG. 7 and expressed as in Equations (1)-(3) below.

$$C_{closeloop}=(1+W_2)/(1-[W_1-W_2]) \quad (1)$$

$$W_1=G*EQ_m*SP_r \quad (2)$$

$$W_2=G*EQ_m*SP_m \quad (3)$$

For adaptive feedback system for occlusion cancellation, the adaptive filter G' is used, which is available from AOC adaptation based on a filtered-x (Fx) NLMS algorithm). The updated closed loop function then becomes as shown in Equations (4)-(6) below.

$$C=(1+W_2)/(1-[W_1'-W_2']) \quad (4)$$

$$W_1'=G'*EQ_m*SP_r \quad (5)$$

$$W_2'=G'*EQ_m*SP_m \quad (6)$$

Then, the active residual path from external source to eardrum $D_{c,active}(\omega)$ can be estimated as $D_{c,active}(0))=D_c(\omega)*C(\omega)$, where $D_c(\omega)$ is the actual path (see FIG. 4) and $C(\omega)$ is actively updated as shown in (4)-(6). In order to estimate $D_{c,active}(\omega)$ accurately based on the active adaptive filter gain G', it may be more appropriate to update the estimate of $D_{c,active}(\omega)$ when the own voice is absent and only ambient sound leakage in the ear canal is presented. Therefore, in one embodiment the $D_{c,active}(\omega)$ and corresponding $G_{eq}'(\omega)$ are updated based on an own voice detection (OVD) flag: $D_{c,active}(t)=a*D_{c,active}(t-1)+(1-a)D_c'$ *C, when OVD_flag=0, where 'a' is a forgetting factor within (0,1); e.g., a=0.8 in one example.

Figure 8:
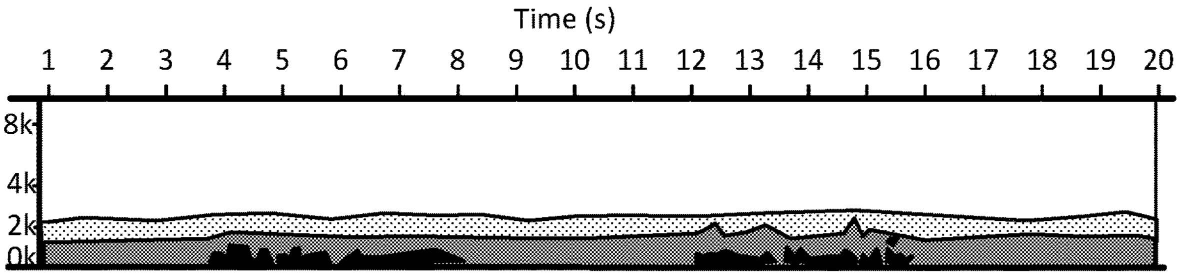
FIGS. 8, 9, and 10 are graphs illustrating an own-voice detection scheme according to an example embodiment.
Figure 9:
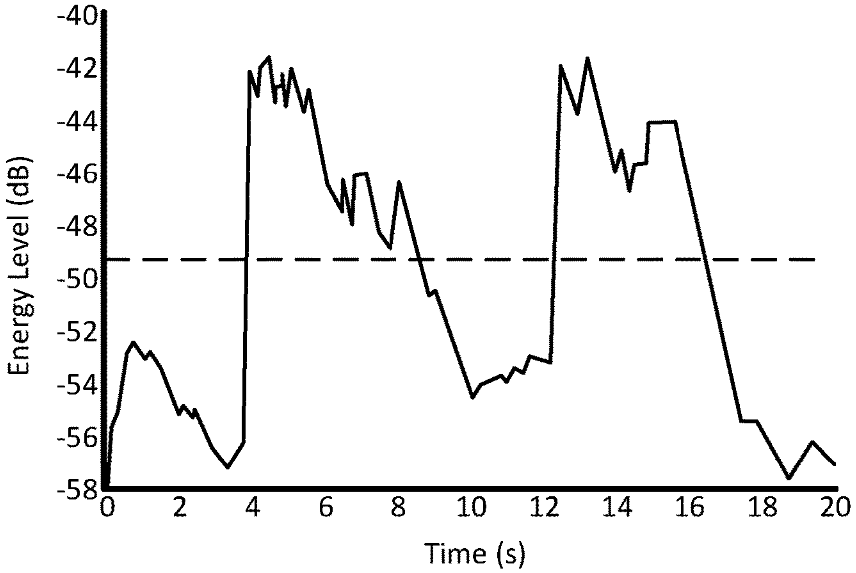
Figure 10:
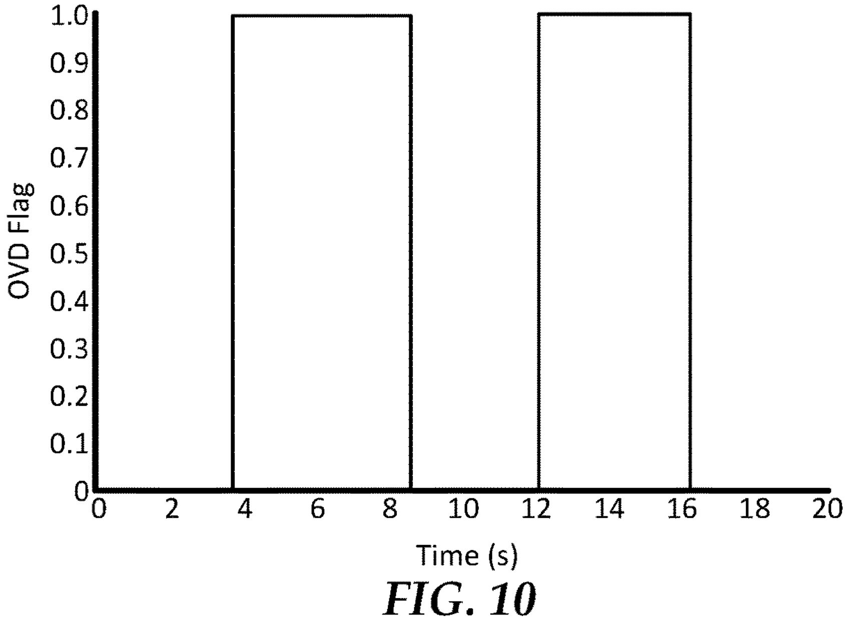

For OVD, an energy-level thresholding-based detection may be used, e.g., power level calculation of band-passed e(n) at corner frequencies of 350 Hz and 900 Hz with smoothing constant of 250 ms for smoothing. The threshold can be empirically set at a threshold vale, e.g., if the smoothed power level is larger than a threshold, then OVD flag=1. In FIG. 8, a spectrogram shows an example of an audio signal containing own-voice together with ambient noise. The darkest regions in FIG. 8 represent relatively high power levels around the 350 Hz to 900 Hz range indicative of own-voice. It will be understood that other frequency range limits may be used for this purpose, e.g., tailored based on the average pitch of the user's own voice. In FIG. 9, a graph shows the band-passed power as a function of time for the signal shown in FIG. 8, with an own-voice detection threshold indicated by the horizontal dashed line. The threshold may be set around −48 dB to −50 dB in this example. In FIG. 10, a graph shows how the application of the threshold to the signal in FIG. 8 can be used to set the OVD flag.

In other embodiments, inertial measurement data (e.g., from an accelerometer) can be used to detect bone-conducted vibration or physical movement due to own voice. These measurements can also be bandpass filtered to improve detection accuracy. In some embodiments, the output of multiple sensors (e.g., internal external/microphones, inertial measurement data) can be combined to jointly estimate periods when the user is and is not speaking and thereby set the OVD flag.

Figures 11, 12:
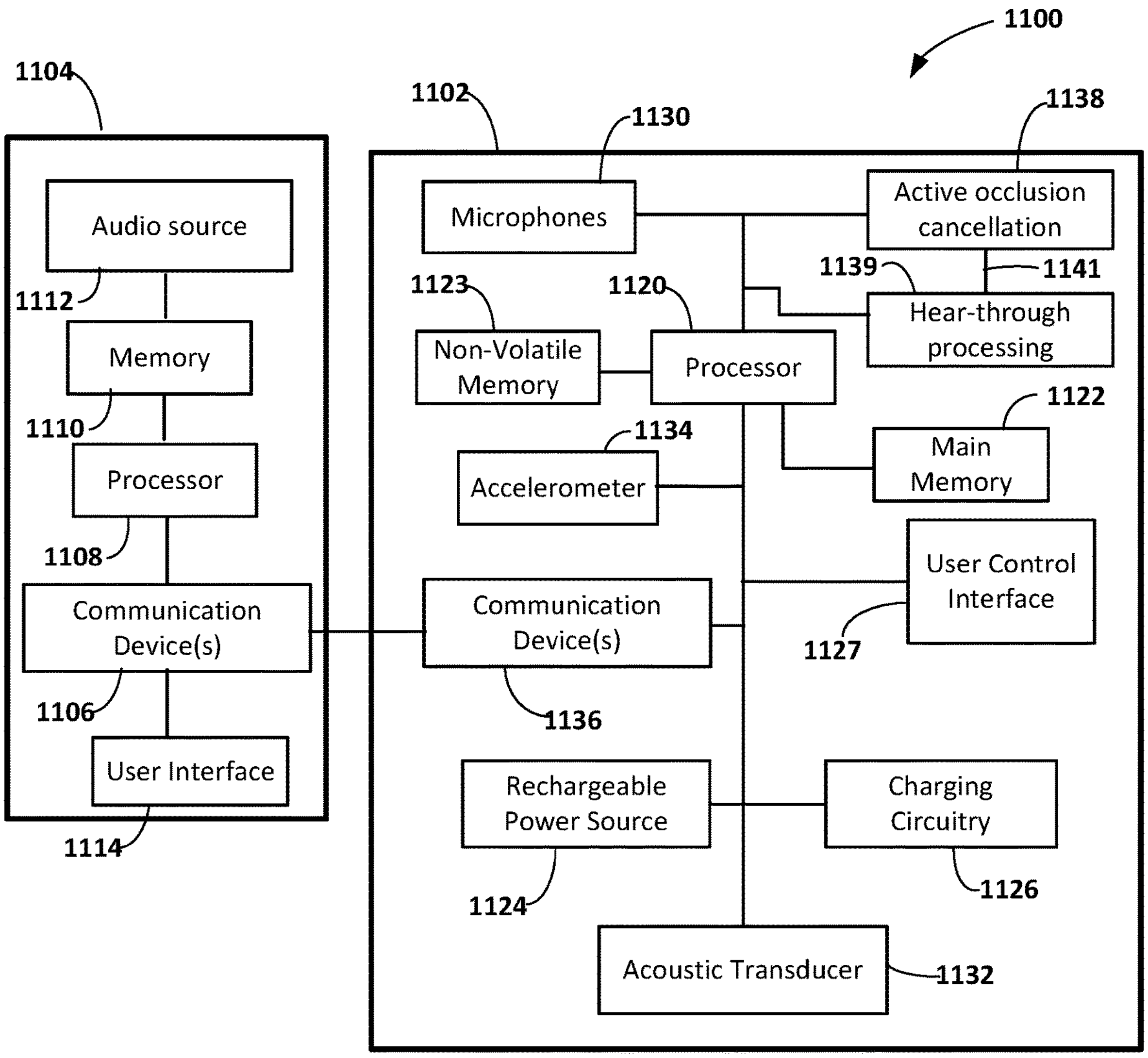
FIG. 11 is a formula illustrating obtaining frequency-domain coefficients based on time-domain filer coefficients according to an example embodiment.
FIG. 12 is a diagram of a method according to an example embodiment.

Given the active residual path from external source to eardrum $D_{c,active}(0))$, the updates to hearthrough filter $G_{EQ}'(\omega)$ are based on $\|(D_m'\hat{D}_I G_{EQ}'+D_{c,active}')-D_o'\|_2^2+\mu\|G_{EQ}'\|^2$. Note that the hearthrough filters in these examples are designed in frequency domain while the AOC updates FIR filters in the time-domain. It is challenging to implement the combination of these two processing in digital signal processor (DSP) filter engine. In one embodiment, a DFT matrix is applied to make the time-domain filter coefficients g' (e.g., vector $N_T$ of length 64) decoupled from the spectral resolution, giving $G'=\underline{\underline{F}}g'$ where F is a $N_F \times N_T$ DFT matrix and $N_F$ is the FFT length for firmware implementation, as shown in the equation of FIG. 11, where $N_F > N_T$. In this equation, I is an $N_T$-by-$N_T$ identity matrix and O is an $(N_F-N_T)$ by $N_T$ zero matrix.

Hear-through can be seen as a special case for hearing aids processing, e.g., hearthrough processing aims to achieve 0 dB insertion gain for all frequency bands. The proposed hearthrough design can be extend to match with hearing aid processing by adding a targeted insertion gain (derived from fitting software) into the following equation: $\hat{D}_{ha}(\omega)=D_m(\omega)D_I(\omega)G_{EQ}'(\omega)+\hat{D}_{c,active}'(\omega)$ and solve for the optimal $G_{EQ}'$ or g', such that $\hat{D}_{ha}(\omega)=D_o(\omega)*E(\omega)$, where $E(\omega)$ denotes the targeted insertion gain vector.

The proposed system can also work with the feature of auto-vent, which is a function that automatically and physically optimizes the venting in hearing aid, to optimize hearing benefit for music or speech under noise. The auto-vent operates by automatically selecting the appropriate vent size for different listening scenarios. As for the settings of auto-vent ON and OFF, $D_I(\omega)$ and $D_c(\omega)$ in FIG. 4 are different for two conditions. Therefore, $D_I(\omega)$ and $D_c(\omega)$ are pre-measured separately for auto-vent ON and OFF the coefficients stored in the device memory. Additionally, two coefficients sets of $H_{sp}$, $H_{eq}$, $H_{eqsp}$ in FIG. 6 can also be measured separately in the active noise cancellation initialization stage and stored in the device memory. It is suggested to reset the whole processing in FIG. 6 when switching between auto-vent ON and OFF to prevent chirping artifacts due to adaptation divergence.

Figure 5:
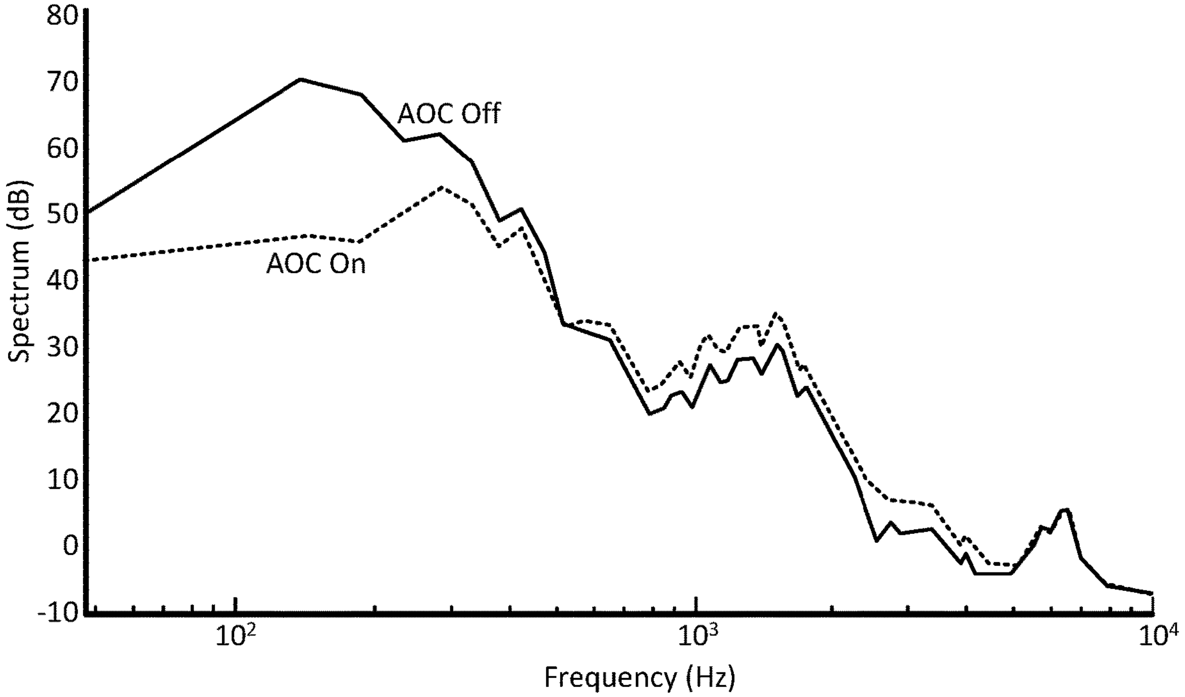
FIG. 5 is a frequency response diagram showing differences in hearing device response with active occlusion cancellation activated and deactivated.

Apart from the hearing device microphone signal that is filtered by hearthrough filter, streaming audio contents can also be added to the receiver end (as shown by $S_{audio}(n)$ in FIG. 5). It may be more appropriate to update the estimate of $D_{c,active}(0))$ when both the own voice and streamed audio is absent and only ambient sound leakage in the ear canal is presented. Therefore, the $D_{c,active}(\omega)$ and corresponding $G_{EQ}'(\omega)$ can be updated based on the own voice detection flag as well as the audio streaming flag: $D_{c,active}(t)=a*D_{c,active}(t-1)+(1-a)D_c'$ *C, when (OVD_flag||Streaming_flag)=0.

In FIG. 12, a block diagram illustrates a system and ear-worn hearing device 1100 in accordance with any of the embodiments disclosed herein. The hearing device 1100 includes a housing 1102 configured to be worn in, on, or about an ear of a wearer. The hearing device 1100 shown in FIG. 11 can represent a single hearing device configured for monaural or single-ear operation or one of a pair of hearing devices configured for binaural or dual-ear operation. The hearing device 1100 shown in FIG. 11 includes a housing 1102 within or on which various components are situated or supported. The housing 1102 can be configured for deployment on a wearer's ear (e.g., a behind-the-ear device housing), within an ear canal of the wearer's ear (e.g., an in-the-ear, in-the-canal, invisible-in-canal, or completely-in-the-canal device housing) or both on and in a wearer's ear (e.g., a receiver-in-canal or receiver-in-the-ear device housing).

The hearing device 1100 includes a processor 1120 (also referred to as a system processor) operatively coupled to a main memory 1122 and a non-volatile memory 1123. The processor 1120 can be implemented as one or more of a multi-core processor, a digital signal processor (DSP), a microprocessor, a programmable controller, a general-purpose computer, a special-purpose computer, a hardware controller, a software controller, a combined hardware and software device, such as a programmable logic controller, and a programmable logic device (e.g., FPGA, ASIC). The processor 1120 can include or be operatively coupled to main memory 1122, such as RAM (e.g., DRAM, SRAM). The processor 1120 can include or be operatively coupled to non-volatile (persistent) memory 1123, such as ROM, EPROM, EEPROM or flash memory. As will be described in detail hereinbelow, the non-volatile memory 1123 is configured to store instructions that facilitate using active occlusion cancellation with audio hear-through.

The hearing device 1100 includes an audio processing facility operably coupled to, or incorporating, the processor 1120. The audio processing facility includes audio signal processing circuitry (e.g., analog front-end, analog-to-digital converter, digital-to-analog converter, DSP, and various analog and digital filters), a microphone arrangement 1130, and an acoustic transducer 1132 (e.g., loudspeaker, receiver, bone conduction transducer). The microphone arrangement 1130 can include one or more discrete microphones or a microphone array(s) (e.g., configured for microphone array beamforming). Each of the microphones of the microphone arrangement 1130 can be situated at different locations of the housing 1102. It is understood that the term microphone used herein can refer to a single microphone or multiple microphones (e.g., a microphone array) unless specified otherwise.

At least one of the microphones 1130 may be configured as a reference microphone producing a reference signal in response to external sound outside an ear canal of a user. Another of the microphones 1130 may be configured as an error microphone producing an error signal in response to sound inside of the ear canal. A physical propagation path between the reference microphone and the error microphone defines a primary path of the hearing device 1100. The acoustic transducer 1132 produces amplified sound inside of the ear canal. The amplified sound propagates over a secondary path to combine with direct noise at the ear canal, the summation of which is sensed by the error microphone.

The hearing device 1100 may also include a user interface with a user control interface 1127 operatively coupled to the processor 1120. The user control interface 1127 is configured to receive an input from the wearer of the hearing device 1100. The input from the wearer can be any type of user input, such as a touch input, a gesture input, or a voice input. The user control interface 1127 may be configured to receive an input from the wearer of the hearing device 1100.

The hearing device 1100 also includes an active occlusion canceller 1138 and a hear-through processor 1139 both operably coupled to the system processor 1120. The active occlusion canceller 1138 and the hear-through processor 1139 can be implemented in software, hardware, or a combination of hardware and software. The active occlusion canceller 1138 and the hear-through processor 1139 can be a component of, or integral to, the processor 1120 or another processor coupled to the processor 1120. The active occlusion canceller 1138 is configured to reduce or eliminate coloration of reproduced sound due to the hearing device 1100 partially or fully blocking the ear canal. The hear-through processor 1139 receives signals from an external microphone 1130 and reproduces the sounds at the acoustic transducer 1132. As indicated by the line 1141 therebetween, the active occlusion canceller 1138 and the hear-through processor 1139 include adaptive filters that are updated jointly, that is an update to one adaptive filter (e.g., in the hearthrough processor 1139) is used to update another adaptive filter (e.g., in the active occlusion canceller 1138). Joint optimization implies that the combination of AOC and hear-through will correspond to an open ear transfer function ($D_o$). The performance of AOC need not change with or without the joint optimization, although the values (e.g., gain) of the hearthrough filter is changed with the joint optimization.

The hearing device 1100 can include one or more communication devices 1136. For example, the one or more communication devices 1136 can include one or more radios coupled to one or more antenna arrangements that conform to an IEEE 802.11 (e.g., Wi-Fi®) or Bluetooth® (e.g., BLE, Bluetooth® 4.2, 5.0, 5.1, 5.2 or later) specification, for example. In addition, or alternatively, the hearing device 1100 can include a near-field magnetic induction (NFMI) sensor (e.g., an NFMI transceiver coupled to a magnetic antenna) or telecoil for effecting short-range communications (e.g., ear-to-ear communications, ear-to-kiosk communications). The communications device 1136 may also include wired communications, e.g., universal serial bus (USB) and the like.

The communication device 1136 is operable to allow the hearing device 1100 to communicate with an external computing device 1104, e.g., a smartphone, laptop computer, etc. The external computing device 1104 includes a communications device 1106 that is compatible with the communications device 1136 for point-to-point or network communications. The external computing device 1104 includes its own processor 1108 and memory 1110, the latter which may encompass both volatile and non-volatile memory. The external computing device 1104 includes a user interface 1114 that facilitates performing the operations described herein with both the external computing device 1104 and the hearing device 1100.

The external computing device 1104 includes a streaming audio content source 1112 (e.g., streaming audio from microphone, streaming audio from file playback, etc.) that may operate in with the hear-through processor 1139, e.g., by combining the audio content stream with the hear-through signals. A similar audio content stream may be provided by an external device such as a telecoil signal transmitter, which may or may not include a digital processor. The hearing device 1100 may receive such signals via a telecoil or NFMI, and reproduce the signals as sounds in the processing stream. The active occlusion canceller 1138 and the hear-through processor 1139 may detect the audio content stream and prevent updates to hearthrough filters during such streaming. A similar pausing of the updates may occur in response to own voice detection, which may use microphones 1130 and/or an accelerometer 1134 to detect the user's voice.

The hearing device 1100 also includes a power source, which can be a conventional battery, a rechargeable battery (e.g., a lithium-ion battery), or a power source comprising a supercapacitor. In the embodiment shown in FIG. 5, the hearing device 1100 includes a rechargeable power source 1124 which is operably coupled to power management circuitry for supplying power to various components of the hearing device 1100. The rechargeable power source 1124 is coupled to charging circuitry 1126. The charging circuitry 1126 is electrically coupled to charging contacts on the housing 1102 which are configured to electrically couple to corresponding charging contacts of a charging unit when the hearing device 1100 is placed in the charging unit.

Figure 13:
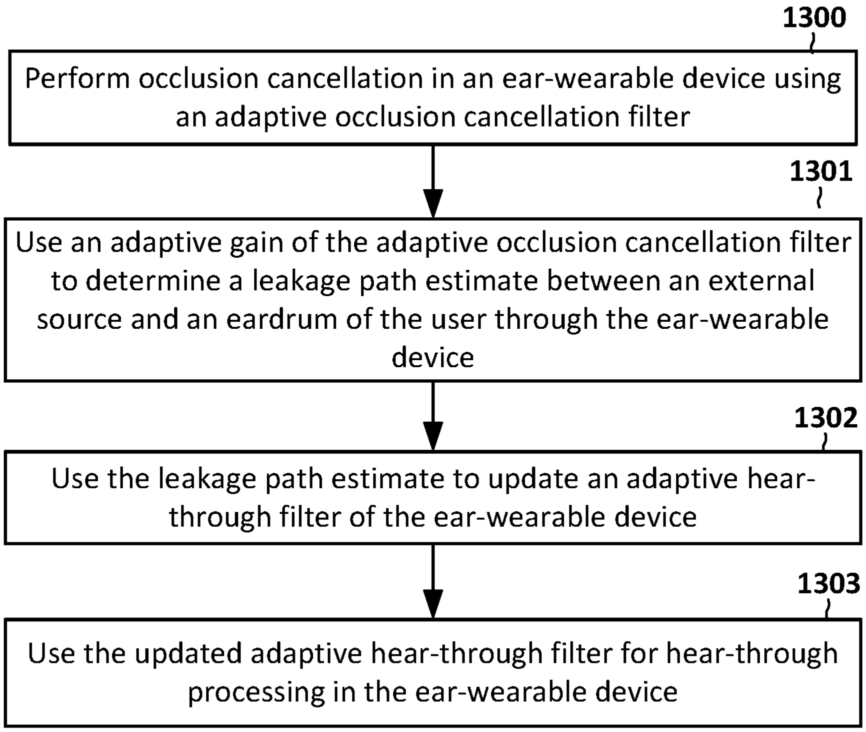
FIGS. 13 and 14 are flowcharts of methods according to example embodiments.

In FIG. 13, a flowchart shows a method according to an example embodiment. The method involves performing 1300 adaptive occlusion cancellation in an ear-wearable device using an adaptive filter. An adaptive gain of the adaptive filter is used 1301 to determine a leakage path estimate between an external source and an eardrum of the user through the ear-wearable device. The leakage path estimate is used 1302 to update an adaptive hear-through filter of the ear-wearable device. The updated adaptive hear-through filter is used 1303 for hear-through processing in the ear-wearable device.

Figure 14:
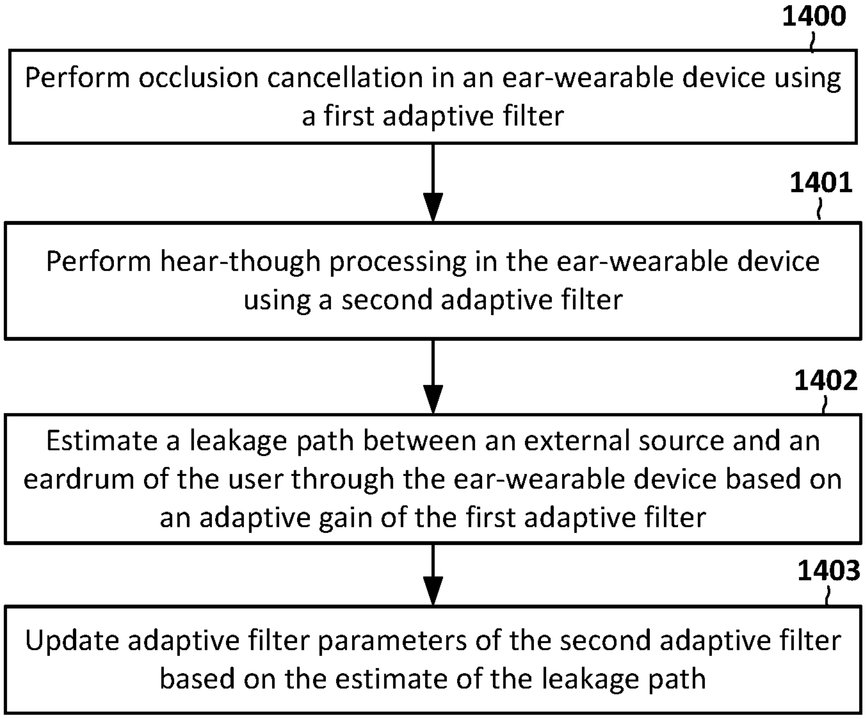

In FIG. 14, a flowchart shows a method according to another example embodiment. The method involves performing 1400 adaptive occlusion cancellation in an ear-wearable device using a first adaptive filter. Hear-though processing is performed 1401 in the ear-wearable device using a second adaptive filter. A leakage path is estimated 1402 between an external source and an eardrum of the user through the ear-wearable device based on an adaptive gain of the first adaptive filter. Adaptive filter parameters of the second adaptive filter is updated 1403 based on the estimate of the leakage path.

This document discloses numerous example embodiments, including but not limited to the following:

Example 1 is a method, comprising: performing occlusion cancellation in an ear-wearable device using an adaptive occlusion cancellation filter; using an adaptive gain of the adaptive occlusion cancellation filter to determine a leakage path estimate between an external source and an eardrum of a user through the ear-wearable device; using the leakage path estimate to update an adaptive hear-through filter of the ear-wearable device; and using the updated adaptive hear-through filter for hear-through processing in the ear-wearable device. Example 2 includes the method of example 1, wherein using the leakage path to update the hear-through filter jointly optimizes the adaptive occlusion cancellation and the hear-through processing. Example 3 includes the method of example 1 or 2, wherein the adaptive occlusion cancellation filter is a normalized, filtered-x least mean square (Fx-NLMS) filter.

Example 4 includes the method of any one of examples 1-3, wherein the updating of the hear-through filter of the ear-wearable device is performed only when an own voice of the user is absent such that only ambient sound leakage in an ear canal of the user is present. Example 5 includes the method of example 4, wherein determining that the own voice is absent utilizes an energy level threshold detection of an audio signal of the ear-wearable device. Example 6 includes the method of example 5, wherein the energy level threshold detection comprises band pass filtering using corner frequencies of 350 Hz and 900 Hz with a smoothing constant of 250 ms. Example 7 includes the method of example 4, wherein determining that the own voice is absent utilizes an inertial measurement unit to detect bone-conducted vibration or physical movement due to the own voice of the user.

Example 8 includes the method of any one of examples 1-7, wherein the ear-wearable device inserts an audio content stream into an audio processing path, the updating of the hear-through filter of the ear-wearable device being performed only when the audio content stream is absent. Example 9 includes the method of example 8, wherein the audio content stream originates from a telecoil.

Example 10 includes the method of any one of examples 1-9, wherein the hear-through processing uses a targeted insertion gain derived from a fitting of the ear-wearable device to the user. Example 11 includes the method of any one of examples 1-10, further comprising detecting an auto-vent state of the ear-wearable device, wherein transform coefficients of the hear-through filter are changed based on the auto-vent state. Example 12 includes the method of example 11, wherein at least one of the hear-through processing and the adaptive occlusion cancellation is reset when a change of the auto-vent state is detected. Example 13 includes the method of any one of examples 1-12, wherein the adaptive hear-through filter operates in a frequency domain and the adaptive occlusion cancellation filter operates in a time domain, the method further comprising applying a discrete Fourier transform matrix to time-domain filter coefficients of the adaptive occlusion cancellation filter to obtain frequency domain filter coefficients for the adaptive hear-through filter.

Example 14 is an ear-wearable device, comprising: an external microphone operable to receive external sound from an external source; an internal microphone configured to receive internal sound from an ear canal of a user; a receiver configured to reproduce sound in the ear canal; and a controller operatively coupled to the external microphone, the internal microphone, and the receiver, the controller operable to: perform occlusion cancellation using an adaptive occlusion cancellation filter; use an adaptive gain of the adaptive occlusion cancellation filter to determine a leakage path estimate between the external source and an eardrum of the user through the ear-wearable device; use the leakage path estimate to update an adaptive hear-through filter of the ear-wearable device; and use the updated adaptive hear-through filter for hear-through processing in the ear-wearable device.

Example 15 includes the ear-wearable device of example 14, wherein using the leakage path to update the hear-through filter jointly optimizes the adaptive occlusion cancellation and the hear-through processing. Example 16 includes the ear-wearable device of example 14 or 15, wherein the adaptive occlusion cancellation filter is a normalized, filtered-x least mean square (Fx-NLMS) filter.

Example 17 includes the ear-wearable device of any one of examples 14-16, wherein the updating of the hear-through filter of the ear-wearable device is performed only when an own voice of the user is absent such that only ambient sound leakage in an ear canal of the user is present. Example 18 includes the ear-wearable device of example 17, wherein determining that the own voice is absent utilizes an energy level threshold detection of an audio signal of the ear-wearable device. Example 19 includes the ear-wearable device of example 18, wherein the energy level threshold detection comprises band pass filtering using corner frequencies of 350 Hz and 900 Hz with a smoothing constant of 250 ms. Example 20 includes the ear-wearable device of example 17, wherein determining that the own voice is absent utilizes an inertial measurement unit to detect bone-conducted vibration or physical movement due to the own voice of the user.

Example 21 includes the ear-wearable device of any one of examples 14-20, wherein the ear-wearable device inserts an audio content stream into an audio processing path, the updating of the hear-through filter of the ear-wearable device being performed only when the audio content stream is absent. Example 22 includes the ear-wearable device of example 21, wherein the audio content stream originates from a telecoil.

Example 23 includes the ear-wearable device of any one of examples 14-22, wherein the hear-through processing uses a targeted insertion gain derived from a fitting of the ear-wearable device to the user. Example 24 includes the ear-wearable device of any one of examples 14-23, further comprising an auto-vent, the controller further operable to detect a state of the auto-vent, wherein transform coefficients of the hear-through filter are changed based on the state of the auto-vent state. Example 25 includes the ear-wearable device of example 24, wherein at least one of the hear-through processing and the adaptive occlusion cancellation is reset when a change of the state of the auto-vent is detected.

Example 26 includes the ear-wearable device of any one of examples 14-25, wherein the adaptive hear-through filter operates in a frequency domain and the adaptive occlusion cancellation filter operates in a time domain, the controller further operable to apply a discrete Fourier transform matrix to time-domain filter coefficients of the adaptive occlusion cancellation filter to obtain frequency domain filter coefficients for the adaptive hear-through filter.

Example 27 is a method comprising: performing occlusion cancellation in an ear-wearable device using a first adaptive filter; performing hear-though processing in the ear-wearable device using a second adaptive filter; estimating a leakage path between an external source and an eardrum of a user through the ear-wearable device based on an adaptive gain of the first adaptive filter; and updating adaptive filter parameters of the second adaptive filter based on the estimate of the leakage path.

Example 28 includes the method of example 27, wherein estimating the leakage path jointly optimizes the first and second adaptive filters. Example 29 includes the method of example 27 or 28, wherein the first adaptive filter is a normalized, filtered-x least mean square (Fx-NLMS) filter. Example 30 includes the method of any one of examples 27-29, wherein the updating of the adaptive filter parameters of the second adaptive filter is performed only when an own voice of the user is absent such that only ambient sound leakage in an ear canal of the user is present. Example 31 includes the method of example 30, wherein determining that the own voice is absent utilizes an energy level threshold detection of an audio signal of the ear-wearable device. Example 32 includes the method of example 30, wherein determining that the own voice is absent utilizes an inertial measurement unit to detect bone-conducted vibration or physical movement due to the own voice of the user.

Example 33 includes the method of any one of examples 27-32, wherein the ear-wearable device inserts an audio content stream into an audio processing path, the updating of the adaptive filter parameters of the second adaptive filter being performed only when the audio content stream is absent. Example 34 includes the method of any one of examples 27-33, further comprising detecting an auto-vent state of the ear-wearable device, wherein transform coefficients of the second adaptive filter are changed based on the auto-vent state. Example 35 includes the method of any one of examples 27-34, wherein the second adaptive filter operates in a frequency domain and the first adaptive filter operates in a time domain, the method further comprising applying a discrete Fourier transform matrix to time-domain filter coefficients of the first adaptive filter to obtain frequency domain filter coefficients for the second adaptive filter. Example 36 is an apparatus comprising a controller operable to perform the method of any one of examples 27-35 and comprising the ear-wearable device.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

The invention claimed is:

1. A method, comprising:

performing occlusion cancellation in an ear-wearable device using an adaptive occlusion cancellation filter;

using an adaptive gain of the adaptive occlusion cancellation filter to determine a leakage path estimate between an external source and an eardrum of a user through the ear-wearable device;

using the leakage path estimate to update an adaptive hear-through filter of the ear-wearable device; and using the updated adaptive hear-through filter for hear-through processing in the ear-wearable device.

2. The method of claim 1, wherein using the leakage path to update the hear-through filter jointly optimizes the adaptive occlusion cancellation and the hear-through processing such that a combination of the adaptive occlusion cancellation and the hear-through processing will correspond to an open ear transfer function.

3. The method of claim 1, wherein the adaptive occlusion cancellation filter is a normalized, filtered-x least mean square (Fx-NLMS) filter.

4. The method of claim 1, wherein the updating of the hear-through filter of the ear-wearable device is performed only when an own voice of the user is absent such that only ambient sound leakage in an ear canal of the user is present.

5. The method of claim 4, wherein determining that the own voice is absent utilizes an energy level threshold detection of an audio signal of the ear-wearable device.

6. The method of claim 5, wherein the energy level threshold detection comprises band pass filtering using corner frequencies of 350 Hz and 900 Hz with a smoothing constant of 250 ms.

7. The method of claim 4, wherein determining that the own voice is absent utilizes an inertial measurement unit to detect bone-conducted vibration or physical movement due to the own voice of the user.

8. The method of claim 1, wherein the ear-wearable device inserts an audio content stream into an audio processing path, the updating of the hear-through filter of the ear-wearable device being performed only when the audio content stream is absent.

9. The method of claim 8, wherein the audio content stream originates from a telecoil.

10. The method of claim 1, wherein the hear-through processing uses a targeted insertion gain derived from a fitting of the ear-wearable device to the user.

11. The method of claim 1, further comprising detecting an auto-vent state of the ear-wearable device, wherein transform coefficients of the hear-through filter are changed based on the auto-vent state.

12. The method of claim 11, wherein at least one of the hear-through processing and the adaptive occlusion cancellation is reset when a change of the auto-vent state is detected.

13. The method of claim 1, wherein the adaptive hear-through filter operates in a frequency domain and the adaptive occlusion cancellation filter operates in a time domain, the method further comprising applying a discrete Fourier transform matrix to time-domain filter coefficients of the adaptive occlusion cancellation filter to obtain frequency domain filter coefficients for the adaptive hear-through filter.

14. An ear-wearable device, comprising:

an external microphone operable to receive external sound from an external source;

an internal microphone configured to receive internal sound from an ear canal of a user;

a receiver configured to reproduce sound in the ear canal; and a controller operatively coupled to the external microphone, the internal microphone, and the receiver, the controller operable to:

perform occlusion cancellation using an adaptive occlusion cancellation filter;

use an adaptive gain of the adaptive occlusion cancellation filter to determine a leakage path estimate between the external source and an eardrum of the user through the ear-wearable device;

use the leakage path estimate to update an adaptive hear-through filter of the ear-wearable device; and use the updated adaptive hear-through filter for hear-through processing in the ear-wearable device.

15. The ear-wearable device of claim 14, wherein using the leakage path to update the hear-through filter jointly optimizes the adaptive occlusion cancellation and the hear-through processing such that a combination of the adaptive occlusion cancellation and the hear-through processing will correspond to an open ear transfer function.

16. The ear-wearable device of claim 14, wherein the adaptive occlusion cancellation filter is a normalized, filtered-x least mean square (Fx-NLMS) filter.

17. The ear-wearable device of claim 14, wherein the updating of the hear-through filter of the ear-wearable device is performed only when an own voice of the user is absent such that only ambient sound leakage in an ear canal of the user is present, and wherein determining that the own voice is absent utilizes an energy level threshold detection of an audio signal of the ear-wearable device.

18. The ear-wearable device of claim 17, wherein the energy level threshold detection comprises band pass filtering using corner frequencies of 350 Hz and 900 Hz with a smoothing constant of 250 ms.

19. The ear-wearable device of claim 17, wherein determining that the own voice is absent utilizes an inertial measurement unit to detect bone-conducted vibration or physical movement due to the own voice of the user.

20. The ear-wearable device of claim 14, wherein the ear-wearable device inserts an audio content stream into an audio processing path, the updating of the hear-through filter of the ear-wearable device being performed only when the audio content stream is absent.

* * * * *